G. SMITH.
Improvement in Safety Thill Attachments.
No. 130,667. Patented Aug 20, 1872.
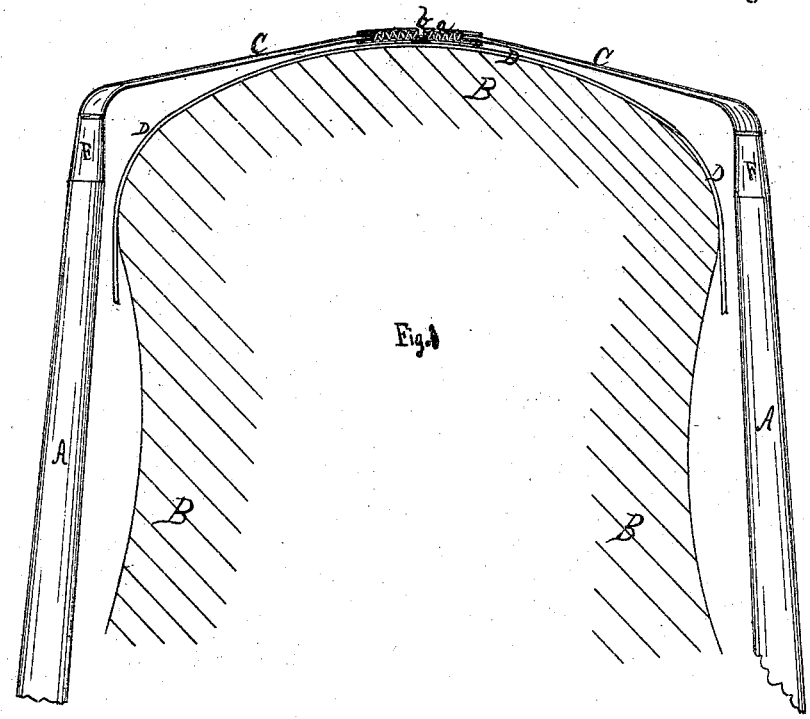
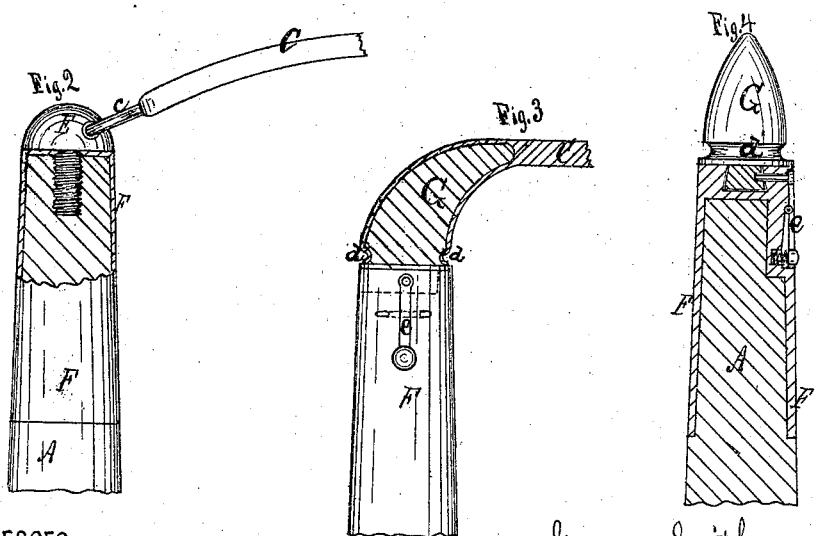
WITNESSES.
Granger Smith
INVENTOR, By
Burke Fraser & Co.
Attys.

UNITED STATES PATENT OFFICE.

GRANGER SMITH, OF BUFFALO, NEW YORK.

IMPROVEMENT IN SAFETY-THILL ATTACHMENTS.

Specification forming part of Letters Patent No. 130,667, dated August 20, 1872.

SPECIFICATION.

Be it known that I, GRANGER SMITH, of Buffalo, in the county of Erie and State of New York, have invented certain new and useful Improvements in Safety-Thill Attachments, of which the following is a specification:

The object of this invention is to obviate the danger and annoyance caused by the reins catching upon the outer ends of the shafts of wagons of all descriptions; and the invention consists in connecting the outer ends of shafts in front of the horse by means of a removable brace, strap, or spring connection, as hereinafter described.

In the drawing, Figure 1 is a plan of the outer ends of the thills, and giving the outlines of the breast of a horse, with my device attached. Figs. 3 and 4 are detached views, showing the attachment of the strap or brace to the thills. Fig. 2 is a variation, showing a simpler method of attachment.

A A' represent the thills, and B B' indicate the outlines of the breast of a horse when placed in position between them. C C are two straps or braces of any suitable material, secured to the ends of the thills, as shown in Figs. 3 and 4, and connected together in the center by a spring or equivalent device, $a$. This spring is of any suitable form or material, and is covered to protect it from injury. It passes freely through a ring, $b$, attached to the breast-strap or collar D of the harness. This forms the connection between the ends of the thills, and being made elastic in the center does not interfere with the action, forward or back, of the horse, while at the same time it serves as a perfect guard to prevent the reins, &c., from being caught over the ends of the thills, which is a very dangerous and common evil, as all who are in the habit of driving horses will acknowledge. In cases where the ends of the thills extend considerably beyond the horse's breast the use of the ring or loop in the breast-collar may be done away with, leaving nothing but the simple connection from thill to thill.

There are many ways of securing the strap to the ends of the thills, but the two shown are among the simplest. In Fig. 2 I attach to the metal cap F, on the end of the thill, a semicircular-headed screw, E, having a hole through which a snap or other hook, $c$, passes, and fastened to the strap C, as shown. In Figs. 3 and 4 another method is shown. It consists in forming in the end of the metal cap F, on the end of the thill, a dovetailed socket, into which a metal top, G, fits. This is formed, as shown in cross section in Fig. 3, with a groove, $d$, around its base, and the end of the strap C being hollow is secured around it and held firmly thereon. The dovetailed piece G is held in the cap F by a self-acting spring, $e$, (or other catch,) which fastens into a cavity in the dovetailed projection on the piece G. A slight pressure on the catch releases it.

What I claim is—

The front ends of shafts or thills of a vehicle connected together by a connection, C, which is adapted to be contracted and expanded by a flexible connection, $a$, substantially as and for the purposes herein specified.

In witness whereof I have hereunto signed my name in the presence of two subscribing witnesses.

GRANGER SMITH.

Witnesses:
J. R. DRAKE,
C. N. WOODWARD.